S. M. MARSHALL.
HOSE REEL.
APPLICATION FILED SEPT. 9, 1909.

975,147.

Patented Nov. 8, 1910.

Witnesses:
C. F. M—
E. M. Allen.

Inventor:
S. M. Marshall
by attorneys
Southgate & Southgate.

UNITED STATES PATENT OFFICE.

STEPHEN M. MARSHALL, OF CLINTON, MASSACHUSETTS.

HOSE-REEL.

975,147.  Specification of Letters Patent.  Patented Nov. 8, 1910.

Application filed September 9, 1909. Serial No. 516,909.

*To all whom it may concern:*

Be it known that I, STEPHEN M. MARSHALL, a citizen of the United States, residing at Clinton, in the county of Worcester and State of Massachusetts, have invented a new and useful Hose-Reel, of which the following is a specification.

This invention relates to a reel for hose, and the principal objects thereof are to provide a simple, inexpensive hose reel on which the hose can be wound in such a way that it can be used for discharging fluid without unwinding the entire body of hose and to provide improvements in details of construction for assisting in carrying out the above mentioned object.

Further objects and advantages of the invention will appear hereinafter.

Figure 1:
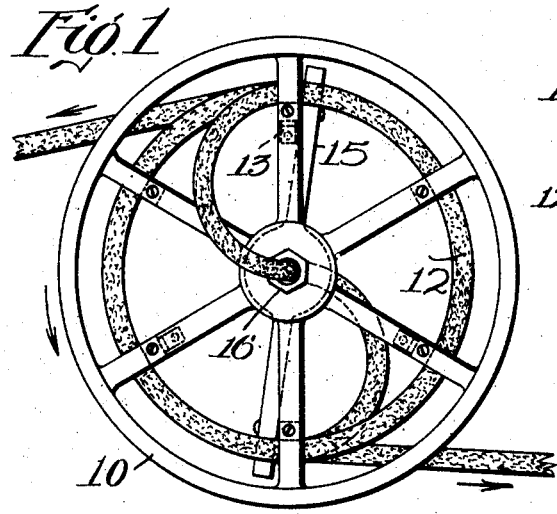
Figure 2:
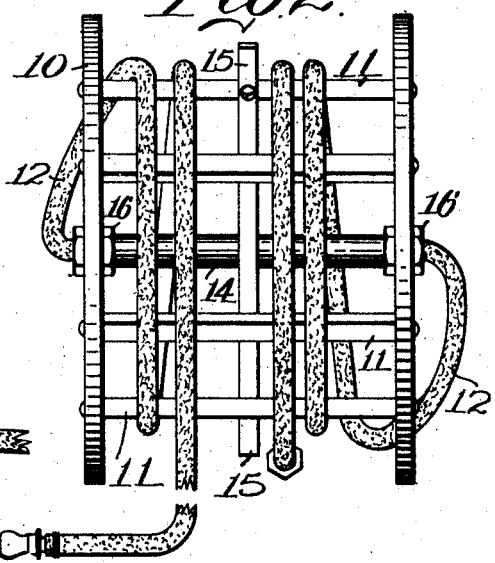
Figure 3:
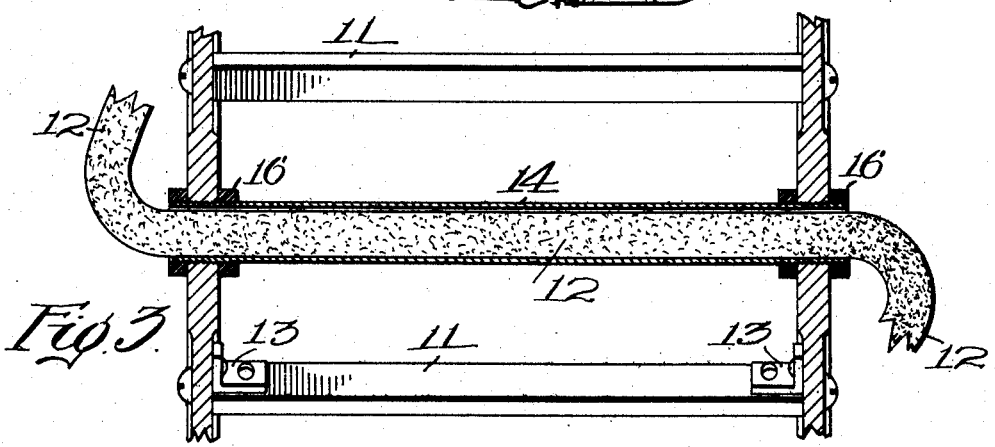

Reference is to be had to the accompanying drawings in which,

Figure 1 is an end view of a hose reel constructed in accordance with this invention. Fig. 2 is a side view thereof. Fig. 3 is a longitudinal sectional view partly broken away, and Fig. 4 is a side view of another form in which the invention can be carried out.

Referring first to Figs. 1, 2 and 3, it will be seen that the reel is shown as comprising two end wheels or disks 10 connected by cross pieces 11 which constitute a skeleton cylindrical body on which the hose 12 is adapted to be wound. The cross pieces 11 are shown as secured to the wheels or the spokes thereof by means of screws and brackets 13. Passing through the center of the reel is a longitudinal pipe or tube 14 through which the hose is adapted to pass. Mounted on this pipe or tube is a separating member 15 which has two arms extending in opposite directions past the circumference of the cylindrical body. The tube is shown as fixed to the hubs of the wheels 10 by means of nuts 16. In the use of this form of the reel a single length of hose preferably is employed and it is passed through the central tube until about equal lengths project from the opposite ends. The nuts 16 serve to support the hose extending from the tube. In either case the hose is brought around from each end of the pipe in opposite directions into the spaces between two of the spokes of the wheel on opposite ends and is wound on the cylindrical body 12. In winding it the hose is first placed over one part of the cylindrical body and then the reel is rolled along the ground or rotated in either direction which will wind up the two ends of the hose, the separating member 15 serving to keep the two parts separate. In this way the reel can be hung up or otherwise stored and when it is desired to use it, one end is placed on the permanent connection for receiving it and the reel is placed on the ground. Then the nozzle is pulled forward and it will be found that the reel will roll along the ground and the hose will be unwound at both ends. Consequently, the hose will be unwound twice as fast as is the case with the ordinary reel. The principal value of this arrangement is that the fluid can be turned on while the hose is all wound up and will run through the entire length of hose while most of it is on the reel and the hose can be unwound to any extent without interrupting the flow of fluid. The importance of this will be obvious.

Figure 4:
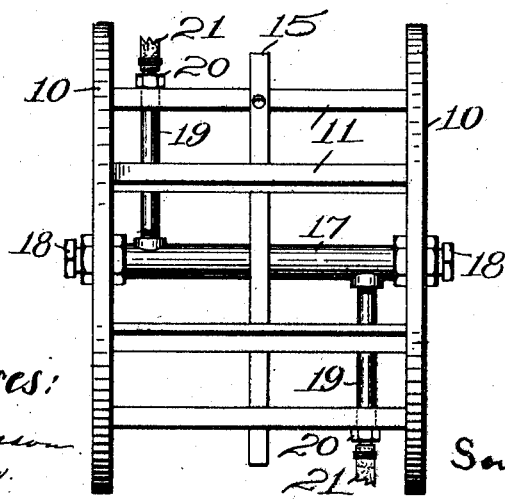

It will be understood that the invention can be embodied in many other forms, one of which is shown in Fig. 4. In this case the parts 10, 11 and 15 are the same as those hereinbefore described, but the central pipe 17 is provided with plugs 18 at its ends and hose sections can be connected at these points, but it is shown as having branch pipes 19 extending from opposite ends and in opposite directions. Each of these is provided with a coupling 20 with which an end of a hose section 21 is adapted to be connected. In this case it is not necessary to thread the hose through the central pipe. This reel is particularly adapted for using two hose sections of equal length instead of a single section and it is more convenient for some purposes, particularly for long hose.

While I have illustrated and described two forms in which this invention can be embodied, I am aware that many modifications can be made therein by any person skilled in the art without departing from the scope of the invention as expressed in the claims. Therefore, I do not wish to be limited to all the details of construction shown and described, but What I do claim is:—

1. As an article of manufacture, a hose reel having a cylindrical space thereon for receiving the hose divided into two parts so that the hose can be wound on the reel from the center toward both ends simultaneously, whereby in unwinding one end by rotation of the reel, the other end will be unwound at an equal rate of speed, the reel having means for supporting a portion of the hose in rigid position.

2. As an article of manufacture, a hose reel having a central longitudinal tube, a hose passing through said tube, the ends of which extend therefrom at opposite ends of the reel, the reel being provided with two spaces on the outside, one for receiving each half of the hose.

3. As an article of manufacture, a hose reel having means extending longitudinally thereof for receiving the center of the hose and having passages through both ends through which the opposite ends of the hose are adapted to pass inwardly so that the hose passed through the center of the reel may be wound on the circumference thereof.

4. As an article of manufacture, a hose reel having a central longitudinal tube, and hose extending from the opposite ends of said tube, said reel having two spaces on the circumference for receiving the two parts of hose thereon.

5. As an article of manufacture, a hose reel adapted to roll along on the ground and provided with two circular ends, a cylindrical space between them for receiving the hose, a central pipe extending therethrough longitudinally between the ends, and a separating plate mounted on said pipe and extending toward the circumference of the reel to separate two portions of the hose to be wound thereon.

In testimony whereof I have hereunto set my hand, in the presence of two subscribing witnesses.

STEPHEN M. MARSHALL.

Witnesses:
FRANK P. BREED,
EDWARD F. HALL.